Dec. 15, 1953  G. NADAY  2,662,692
REVERSIBLE ELECTRONIC COUNTER
Filed Nov. 20, 1948  3 Sheets-Sheet 1
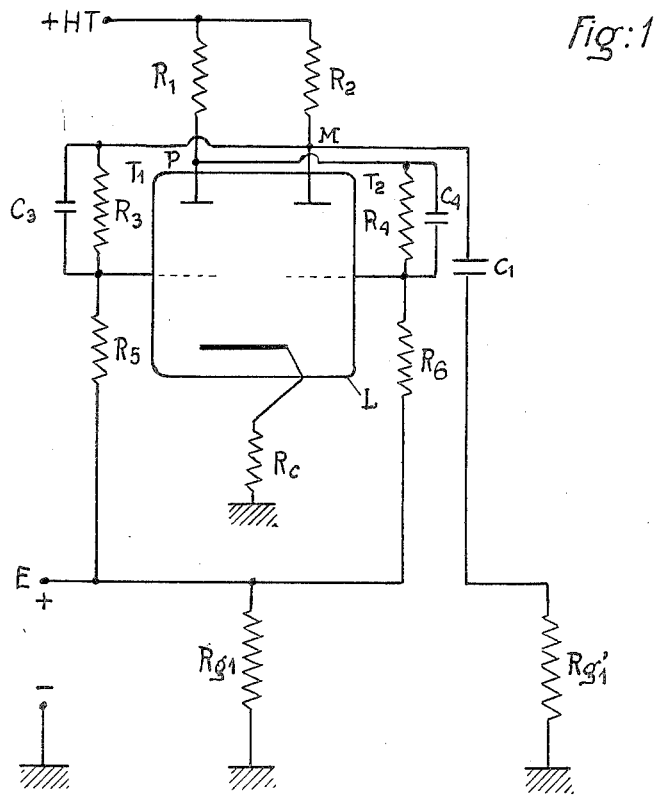
Fig:1
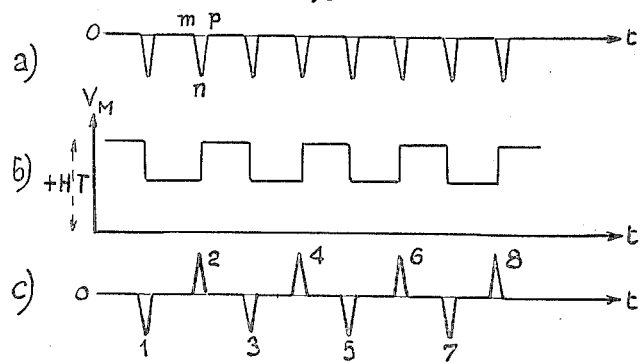
Fig:2
Inventor
GEORGES NADAY
By
Agent Dec. 15, 1953 G. NADAY 2,662,692
REVERSIBLE ELECTRONIC COUNTER
Filed Nov. 20, 1948 3 Sheets-Sheet 2

Inventor
Georges NADAY
By *Fritz C. Hochwald*
Agent

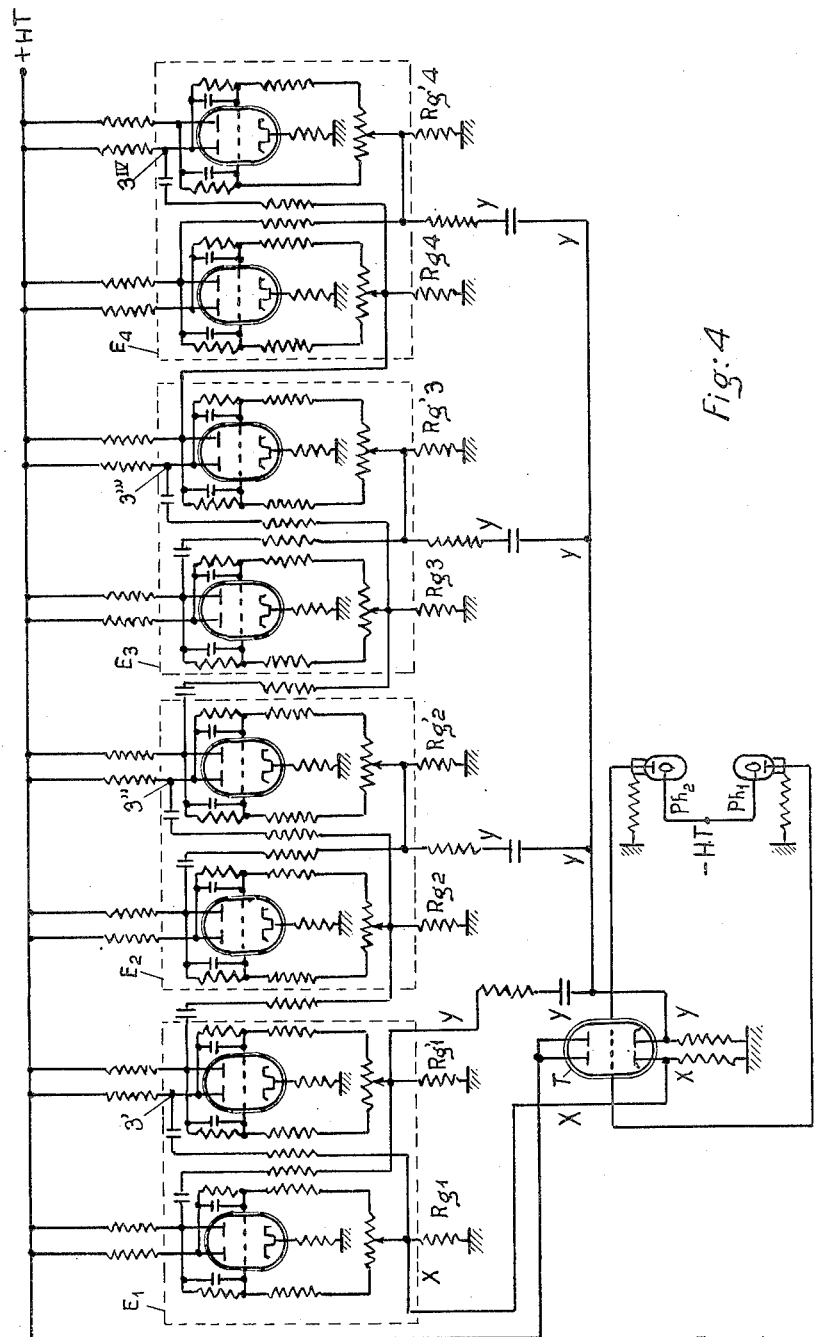

Patented Dec. 15, 1953

2,662,692

UNITED STATES PATENT OFFICE 2,662,692

REVERSIBLE ELECTRONIC COUNTER

Georges Naday, Paris, France, assignor to Compagnie Generale de Telegraphie Sans Fil, a corporation of France Application November 20, 1948, Serial No. 61,203

Claims priority, application France December 18, 1947

5 Claims. (Cl. 235—92)

The present invention relates to electric calculating devices.

A principal object of the invention is to provide a simple and precise method and an improved device which ensures the uncounting in such counter systems. More particularly it relates to counting devices with binary base which are formed by a chain of electronic trigger circuits connected in cascade, whereby each electronic trigger circuit comprises two electronic relays interconnected so that one is blocked and the other unblocked, the set of these electronic trigger circuits adding according to a binary law the impulses applied to their input, their total number being determined by the scale to be obtained.

According to the invention one causes to react certain electronic trigger circuits on the preceding electronic trigger circuits in such a manner that unstable conditions are created and thus the binary scale is transformed into the desired scale and the number of impulses to be uncounted, i. e. to be subtracted from the total, is injected in the electronic trigger circuits controlling the reaction.

The invention will be better understood from the following detailed description in connection with the accompanying drawings in which by way of example the invention is diagrammatically shown in several embodiments.

In the drawings:

Fig. 1 shows diagrammatically an elementary electronic trigger circuit.

Figs. 2a, 2b, 2c are diagrams of the voltages which appear at different characteristic places of the electronic trigger circuit shown in Fig. 1.

Fig. 4 shows a device formed by four scales of three, each of which is composed by two electronic trigger circuits in series, and shows the simultaneous application of an uncounting impulse on the four scales.

Figure 3:
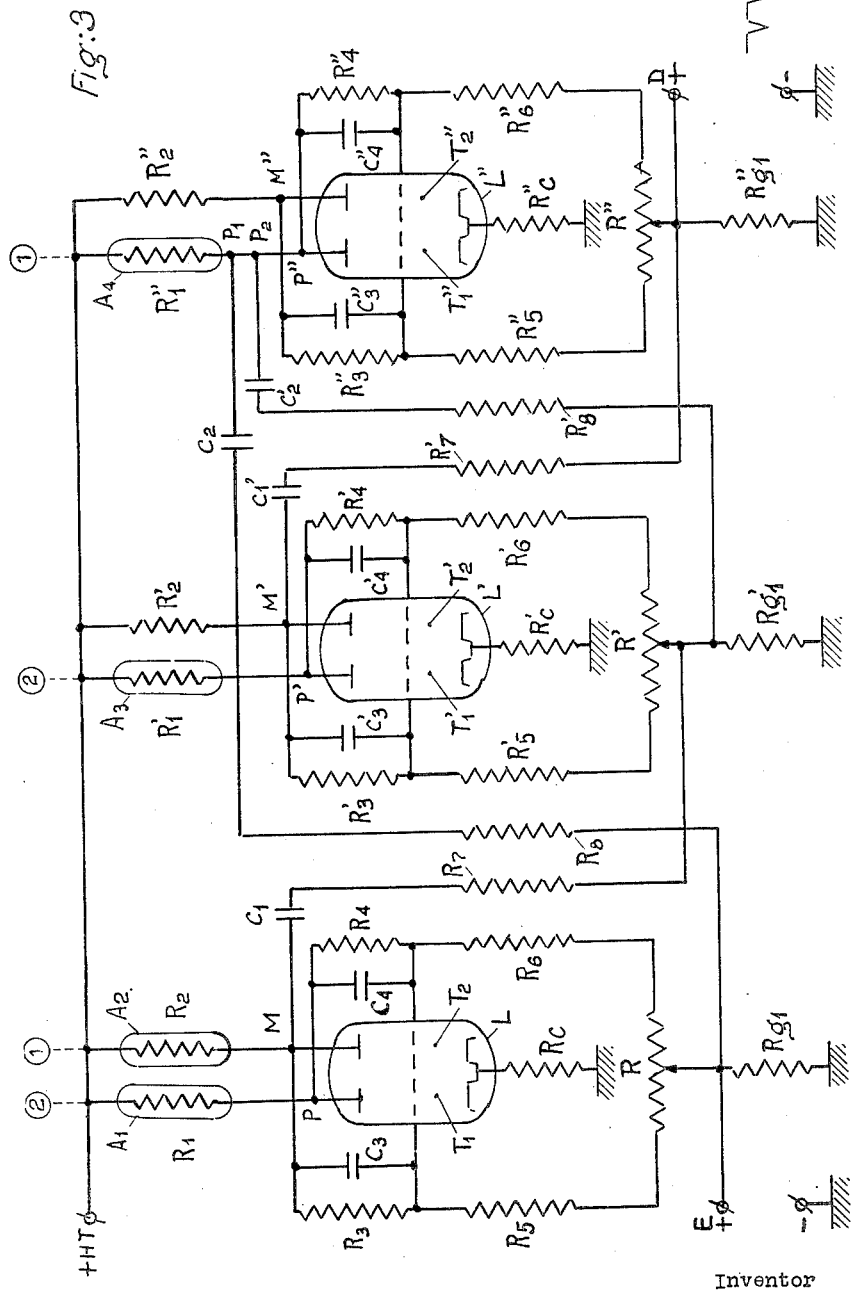
Fig. 3 shows a device forming a scale of five.

Referring now to the drawings and first to Fig. 1, L represents a double triode tube mounted as electronic trigger circuit, $R_1$, $R_2$, $R_3$, $R_4$, $R_5$, $R_6$, $R_{g_1}$, $R'_{g_1}$, $R_c$ are resistances and $C_1$, $C_3$, $C_4$ condensers, all of suitable value. The principle of operation of such a set is as follows:

First it may be assumed that the element $T_1$ of the double triode is conductive. In consequence of the voltage drop in $R_1$ due to the anode current in $T_1$ the grid of the element $T_2$ which is branched off at the point P of the potentiometer formed by $R_4$, $R_6$, and $R_{g_1}$ has a relatively low potential. The cathode resistance $R_c$ is so chosen that under these conditions the potential of the grid of $T_2$ blocks the anode current. Thus there is no voltage drop at the ends of $R_2$ due to an anode current in $T_2$ and the grid of $T_1$ is at a higher potential than that of $T_2$. This state is stable as well as the symmetrical state in which $T_1$ is blocked and $T_2$ conductive.

When a negative impulse, as indicated by Fig. 2a is applied between the terminal E and the ground, it causes a transitory perturbation of the grid bias of the two tubes. The tube $T_2$, which is already blocked, is at first not affected by this perturbation whereas the anode current of the tube $T_1$ diminishes. The polarization of the tube $T_2$ is now increasing because the potential of the point P increases, and the element $T_2$ begins to operate. The current in $R_2$ causes the potential of the point M to decrease, the tube $T_1$ blocks itself and $T_2$ becomes a good conductor. This state lasts until the application of the next impulse.

Fig. 2a shows the diagram of successive impulses applied at the terminal E of Fig. 1. Ot is the axis of time and the negative impulses are represented by negative tips such as $mnp$. In Fig. 2b the corresponding variations of the anode voltage of the tube $T_2$ are shown, i. e. the variation of the potential of the point M which has been denoted by $V_M$. If between the anode of $T_2$ (the point M) and ground a condenser $C_1$ in series with a resistance $R'_{g_1}$ is connected, impulses are obtained between the ends of the resistance whose potentials (1, 2, 3, 4 . . . of Fig. 2c) have different signs corresponding to the changes of anode voltage in $T_2$. The impulses 2, 4, 6 . . . correspond to the charging current and the impulses 1, 3, 5 . . . to the discharging current. The number of negative impulses such as 1, 3, 5 . . . is half as large as the number of impulses such as $mnp$ applied to the terminal E in Fig. 1. Such a set is called a "scale of two." By arranging two scales of two in series one obtains a scale of four; three scales of two give a scale of eight, and so on. By reinjecting predetermined impulses at certain points of the set scales on any base, for instance 5, can be obtained. Such scales are designated as "scales of reaction."

Fig. 3 illustrates a device allowing to obtain a scale of 5 and puts in evidence how according to an embodiment of the invention an uncounting can be easily accomplished. Such a device consists of three electronic trigger circuits, or stages identical to that shown in Fig. 1 and connected in cascade by means of the connections $MC_1R_7R'_{g_1}$ and $M'C'_1R'_7R''_{g_1}$. The same letters as in Fig. 1 denote the same elements for the first electronic trigger circuit, and the corresponding elements of the two succeeding electronic trigger circuits are denoted by the same letters with one or two indices (for instance M, M', M''R_c, R'_c, R''_c etc.). Furthermore connections $P_1C_2R_8R_{g_1}$ and $P_2C'_2R'_8R'_{g_1}$ are provided whose part will be explained later.

Each of the three electronic trigger circuits changes its state according to what has been explained in connection with Fig. 1, when a negative impulse is applied to the grid-resistances $R_{g_1}, R'_{g_1}, R''_{g_1}$. When with O the state of a triode element is denoted which is non-conductive, and with F the state of a conductive triode, the states which can be assumed by the first scale of two consisting of the triodes $T_1$ and $T_2$ are:

|     | $T_1$ | $T_2$ |
| --- | --- | --- |
| I   | O   | F   |
| II  | F   | O   |
| I   | O   | F   | etc.

Every time the element $T_2$ passes from the state O to the state F its anode potential is abruptly reduced; this translates itself by means of the connection $MC_1R_7R'_{g_1}$ into a negative impulse on the terminal of $R'_{g_1}$ and this causes a change of state of the second electronic trigger circuit. Therefore the set of the first two electronic trigger circuits considered by themselves forms a scale of four with the following states:

|     | $T_1$ | $T_2$ | $T'_1$ | $T'_2$ |
| --- | --- | --- | --- | --- |
| I   | O   | F   | O   | F   |
| II  | F   | O   | O   | F   |
| III | O   | F   | F   | O   |
| IV  | F   | O   | F   | O   |
| I   | O   | F   | O   | F   | etc.

The numbers I, II, III . . . denote the negative impulses to be counted which are applied always at the terminal E.

Each time the element $T'_2$ passes from the state O to the state F, its anode potential is abruptly reduced; this translates itself by means of the connection $M'C'_1R'_7R''_{g_1}$ in a negative impulse at the terminals of $R''_{g_1}$ and thus causes a change of state of the third electronic trigger circuit. The set of the three electronic trigger circuits, without taking regard to the connections $P_1C_2R_8R_{g_1}$ and $P_2C_2R'_8R'_{g_1}$, forms a scale of eight which has the following states:

|      | $T_1$ | $T_2$ | $T'_1$ | $T'_2$ | $T''_1$ | $T''_2$ |
| --- | --- | --- | --- | --- | --- | --- |
| I    | O | F | O | F | O | F |
| II   | F | O | O | F | O | F |
| III  | O | F | F | O | O | F |
| IV   | F | O | F | O | O | F |
| V    | O | F | O | F | F | O |
| VI   | F | O | O | F | F | O |
| VII  | O | F | F | O | F | O |
| VIII | F | O | F | O | F | O |
| I    | O | F | O | F | O | F | etc.

The numbers I, II, III . . . always denote the negative adding impulses applied at the terminal E.

The operation of the connection $P_1C_2R_8R_{g_1}$ consists in the production of a supplementary negative impulse at the terminals of $R_{g_1}$ each time the triode $T''_1$ passes from O to F, and the operation of the connection $P_2C'_2R'_8R'_{g_1}$ consists in the production of a supplementary negative impulse at the terminals of $R'_{g_1}$ each time the triode $T''_1$ passes from O to F. These two operations, which are conveniently called "reactions," have the effect of suppressing the states V, VI, VII. In fact, when one considers the state IV

FO    FO    OF the next adding impulse applied to the terminal E changes the state FO of the first electronic trigger circuit to OF. The triode $T_2$, which passes from O to F, sends a negative impulse to the terminals of $R'_{g_1}$ and the second electronic trigger circuit passes to the state OF. The triode $T'_2$, which passes from O to F, sends a negative impulse to the terminals of $R''_{g_1}$ and the third electronic trigger circuit passes to the state FO. But the triode $T''_1$, which passes from O to F, sends owing to the "reactions" or reactive connecting means $C_2$, $R_7$ and $C'_2$, $R'_7$, respectively, a negative impulse to the terminals of $R_{g_1}$ and $R'_{g_1}$ and the new state

FO    FO    FO is obtained which is stable and nothing else than the state VIII, whereas the intermediate states V, VI, VII had no chance of forming themselves.

In summary, one has obtained the states I, II, III, IV, VIII, I, II, . . . , i. e. a scale of five.

In order to carry out the uncounting of a unit one could, according to the known art, apply to the terminal E (termed hereinafter the first input) so many impulses as to the number constituting the scale minus one corresponds, i. e. 5−1=4 uncounting impulses. The invention allows a substantial reduction of the number of uncounting impulses which have to be applied; in the special example which has been considered one impulse is sufficient under the condition that it is applied at the entry terminal of the electronic trigger circuit which causes the "reactions," i. e. at the terminal D (termed hereinafter the second input).

In fact, if it is supposed that one wishes to pass from state IV to state III, one starts from the state IV

FO    FO    OF and applies at the terminal D a negative impulse which causes the third electronic trigger circuit to change from the state OF to the state FO, and the state

FO    FO    FO would be obtained; but the triode $T''_1$ in passing from O to F causes two "reactions" which have the effect of changing the state of the first two electronic trigger circuits so that one obtains

OF    OF    FO but the triodes $T_2$ and $T'_2$ have in turn passed from O to F and thus cause a change of state of the last two electronic trigger circuits so that one obtains the definite state

OF    FO    OF which is nothing else than state III, a stable state.

A similar reasoning holds for the passage of any other state to the preceding one.

The operation of such a device can be represented in a more striking manner in assuming that the resistances $R_1R_2R'_1R''_1$ are filaments of electric lamps $A_1A_2A_3A_4$ which are lighted when the corresponding triode is in the state F and extinguished when it is in the state O. When the value 2 is given to the lamps A₁ and A₃, 1 to the lamps A₂ and A₄, one can represent the table of the five states I, II, III, IV, VIII as follows:

| State | A₁ (2) | A₂ (1) | A₃ (2) | A₄ (1) | Read number |
|---|---|---|---|---|---|
| I |  | lighted |  |  | 1 |
| II | lighted |  |  |  | 2 |
| III | lighted |  | lighted |  | 2+1=3 |
| IV | lighted |  | do |  | 2+2=4 |
| VIII | do |  | do |  | lighted | 2+2+1=5 |
| I |  | lighted |  |  | 1 |

The read numbers are obtained by adding the values corresponding to the lighted lamps.

According to the uncounting explained hereabove, in passing from the state IV to the state III, the lamp A₁ becomes dark, the lamp A₂ becomes lighted and the lamp A₃ remains lighted. One passes from 2+2=4 to 2+1=3.

It should be understood that so many impulses must be applied to the terminal D as there are units to uncount since each impulse allows to pass from the existing state to the preceding one.

Several scales of this type may be used in cascade in an electronic counter which in this case forms a scale of $n^m$, $m$ being the number of scales and $n$ the number of states in each scale. In this case, according to the invention, in order to pass from the state P to the state P—1, an impulse has to be applied simultaneously to all the elements of reinjection. Fig. 4 shows a device of this kind which has four scales or sets of three arranged in cascade. Each scale is surrounded by a dotted rectangle E₁, E₂, E₃, E₄ and comprises two electronic trigger circuits connected in series and comprising a reaction, viz. 3′—R_{g1}, 3″—R_{g2} etc. In order not to burden the drawing the reference numerals are not shown which relate to the various elements other than the entry resistance of various electronic trigger circuits and which are the same as in the case of Fig. 3. A reasoning analogous to the one before and, by the way, even a simpler can be used for showing that the two electronic trigger circuits which form each of the scales form in effect a scale of three. The entry R_{g1} of the first electronic trigger circuit of the scale E₁ is connected to the cathode of the element XX (termed hereinafter the first triode) of the double triode T whereas the entries R′_{g1}, R′_{g2}, R′_{g3}, R′_{g4} are connected in parallel with the cathode of the element YY (termed hereinafter the second triode) of the double triode T. The anodes of this tube are led to the common potential +HT. The grid of the element XX is connected to a first photoelectric cell Ph₁ receiving the impulses of counting, and the grid of the element YY is connected to a second photoelectric cell Ph₂ receiving the impulses of uncounting in the case that one wishes to effect the latter. When a luminous impulse is applied to the cell Ph₂, the latter transforms it into an electric uncounting impulse which is applied simultaneously, by means of the element YY of the double triode T to the entries R′_{g1}, R′_{g2}, R′_{g3}, R′_{g4} of the electronic trigger circuits of the four scales which control the "reactions" 3′—R_{g1}, 3″—R_{g2} etc. and thus makes these electronic trigger circuits change their state. A simple reasoning, analogous to that made in connection with Fig. 3, shows that such a change of state has the effect of uncounting one unit in the elementary scale of three. This corresponds well in total to an uncounting allowing to pass from a state P to a state P—1, for the previous reasoning shows easily that the scales E₂, E₃, E₄ receive a supplementary impulse by the preceding scale at each change of the latter, except when the scale E₁ passes from the state I to the state III. So, for example, if it is supposed that one uncounts on the scale E₁ from 3 to 2 and from 2 to 1, the scale E₂ does not change, but when one passes from 1 to 3 the scale E₂ uncounts one unit. This corresponds exactly to the end to be attained in an adding machine of base 10. For instance, when one uncounts from 53 to 52, from 52 to 51, from 51 to 50, only the units have to vary, whereas in passing from 50 to 49, the tens vary as well.

By applying all the foregoing, it will be easy for anyone skilled in the art to realize the uncounting of impulses in a more or less complex system comprising any scales. For instance, a scale of 10, which is particularly interesting for the decimal system, can be realized by joining in series a scale of two, i. e. an electronic trigger circuit identical to that shown in Fig. 1, to a scale of five, i. e. the device shown in Fig. 3.

The invention is not limited to the type of electronic trigger circuit shown in Fig. 1, but can be applied equally to any device ensuring binary counting. Particularly the electronic trigger circuit can be formed by two electronic relays united by the same envelope (double triode, double pentode, etc.) or by separated relays whose cathodes and anodes are connected in parallel respectively to the sources of current.

What I claim is:

1. An electronic counter for counting numbers, comprising, in combination: a plurality of successive sets including a first set and a last set, each of said sets including a first trigger stage and a second trigger stage, each of said trigger stages including a first electron tube and a second electron tube, each of said electron tubes having a grid circuit and an anode, said anodes of said tubes in any of said trigger stages being connected, respectively, to said grid circuits of said other tubes of said trigger stage so as to block one of said tubes while the other is conducting, thereby imparting to said trigger stage one of two conductive conditions, said trigger stages indicating by the conductive conditions thereof the number to be counted; means connecting, respectively, said anode of said second tube of said trigger stages except said second tube of said second trigger stage of said last set to said grid circuits of said tubes of the next higher one of said trigger stages so as to connect said trigger stages in cascade; reactive means in each of said sets connecting, respectively, in each of said sets said anode of said first tube of said second trigger stage with said grid circuits of said tubes of said first trigger stage so as to render each of said sets a set at the scale of three; a first input for additive impulses connected to said grid circuits of said tubes of said first trigger stage of said first set; and a second input for subtractive impulses connected to said grid circuits of said tubes of said second trigger stages of said sets, whereby on applying a subtractive impulse said second input changes the condition of each of said sets of trigger stages thereby diminishing the number counted by said electronic counter by one unit.

2. An electronic counter for counting numbers, comprising, in combination: a plurality of successive sets including a first set and a last set, each of said sets including a first trigger stage and a second trigger stage, each of said trigger stages including a first electron tube and a second electron tube, each of said electron tubes having a grid circuit and an anode, said anodes of said tubes in any of said trigger stages being connected, respectively, to said grid circuits of said other tubes of said trigger stage so as to block one of said tubes while the other is conducting, thereby imparting to said trigger stage one of two conductive conditions, said trigger stages indicating by the conductive conditions thereof the number to be counted; means connecting, respectively, said anode of said second tube of said trigger stages except said second tube of said second trigger stage of said last set to said grid circuits of said tubes of the next higher one of said trigger stages so as to connect said trigger stages in cascade; reactive means in each of said sets connecting, respectively, in each of said sets said anode of said first tube of said second trigger stage with said grid circuits of said tubes of said first trigger stage so as to render each of said sets a set at the scale of three; a first input for additive impulses connected to said grid circuits of said tubes of said first trigger stage of said first set; a second input for subtractive impulses connected to said grid circuits of said tubes of said second trigger stages of said sets, whereby on applying a subtractive impulse said second input changes the condition of each of said sets of trigger stages thereby diminishing the number counted by said electronic counter by one unit; a first triode having a first cathode and a first grid, said first cathode being connected to said grid circuits of said first trigger stage of said first sets; a first photoelectric cell connected to said first grid so as to enable the additive impulses to be given as light impulses exciting said first photoelectric cell; a second triode having a second cathode and a second grid, said second cathode being connected to said grid circuits of said second trigger stages of said sets; and a second photoelectric cell connected to said second grid so as to enable the subtractive impulses to be given as light impulses exciting said second photoelectric cell.

3. An electronic counter for counting numbers, comprising, in combination: a chain of trigger stages including a first trigger stage and a second trigger stage, each of said trigger stages including a first electron tube and a second electron tube, each of said electron tubes having a grid circuit and an anode, said anodes of said tubes in any of said trigger stages being connected, respectively, to said grid circuits of said other tubes of said trigger stage so as to block one of said tubes while the other is conducting, thereby imparting to said trigger stage one of two conductive conditions, said trigger stages indicating by the conductive conditions thereof the number to be counted; means connecting said anode of said second tube of said first trigger stage to said grid circuits of said tubes of said second trigger stage so as to connect said trigger stages in cascade; a feed back connection connecting said anode of said first tube of said second trigger stage with said grid circuits of said tubes of said first trigger stage so as to suppress at least one of the conditions of said trigger stages and to lower the scale thereof, correspondingly; a first input for additive impulses connected to said grid circuits of said tubes of said first trigger stage; means for producing subtractive impulses; and circuit means connecting said subtractive impulse producing means to said grid circuits of said tubes of said second trigger stage, whereby on production of a subtractive impulse by said producing means said circuits means change the grid potentials of said tubes of said second trigger stage so that said anode of said first tube of said second trigger stage changes the condition thereof which is transferred to said grid circuits of said tubes of said first trigger stage, thereby changing the condition of at least one of said trigger stages and diminishing the number counted by said electronic counter by one unit.

4. An electronic counter for counting numbers, comprising, in combination: a plurality of successive trigger stages including a first trigger stage and a last trigger stage, each of said trigger stages including a first electron tube and a second electron tube, each of said electron tubes having a grid circuit and an anode, said anodes of said tubes in any of said trigger stages being connected, respectively, to said grid circuits of said other tubes of said trigger stage so as to block one of said tubes while the other is conducting, thereby imparting to said trigger stage one of two conductive conditions, said trigger stages indicating by the conductive conditions thereof the number to be counted; means connecting said anode of said second tube of any one of said trigger stages except said last trigger stage to said grid circuits of said tubes of the next higher one of said successive trigger stages so as to connect said trigger stages on cascade; a feedback connection connecting said anode of said first tube of said last trigger stage with said grid circuits of said tubes of at least one of the preceding trigger stages so as to suppress at least one of the conditions of said trigger stages and to lower the scale thereof, correspondingly; a first input for additive impulses connected to said grid circuits of said tubes of said first trigger stage; means for producing subtractive impulses; and circuit means connecting said subtractive impulse producing means to said grid circuits of said tubes of said last trigger stage whereby on production of a subtractive impulse by said producing means said circuit means change the grid potentials of said tubes of said last trigger stage so that said anode of said first tube of said last trigger stage changes the condition thereof which is transferred to said grid circuits of said tubes of said first trigger stage, thereby changing the condition of at least one of said trigger stages and diminishing the number counted by said electronic counter by one unit.

5. An electronic counter for counting numbers, comprising, in combination: a first trigger stage; a second trigger stage; a third trigger stage, each of said trigger stages including a first electron tube and a second electron tube, each of said electron tubes having a grid circuit and an anode, said anodes of said tubes in any of said trigger stages being connected, respectively, to said grid circuits of said other tubes of said trigger stage so as to block one of said tubes while the other is conducting, thereby imparting to said trigger stage one of two conductive conditions, said trigger stages indicating by the conductive conditions thereof the number to be counted; means connecting, respectively, said anode of said second tube of said first and second trigger stages to said grid circuits of said tubes of said second and third trigger stages so as to connect said trigger stages in cascade; a feedback connection connecting said anode of said first tube of said third trigger stage with said grid circuits, respectively, of said tubes of said first and second trigger stages so as to suppress three of the eight conditions of said trigger stages and to lower the scale thereof, correspondingly; a first input for additive impulses connected to said grid circuits of said tubes of said first trigger stage; means for producing subtractive impulses; and circuit means connecting said subtractive impulses producing means to said grid circuits of said tubes of said third trigger stage whereby on production of a subtractive impulse by said producing means said circuit means change the grid potentials of said tubes of said third trigger stage so that said anode of said first tube of said third trigger stage changes the condition thereof which is transferred to said grid circuits of said tubes of said first and second trigger stages, thereby changing the condition of at least one of said trigger stages and diminishing the number counted by said electronic counter by one unit.

GEORGES NADAY.

References Cited in the file of this patent

UNITED STATES PATENTS

| Number | Name | Date |
|---|---|---|
| 2,409,689 | Morton | Oct. 22, 1946 |
| 2,410,156 | Flory | Oct. 29, 1946 |
| 2,428,990 | Rajchman | Oct. 14, 1947 |
| 2,436,963 | Grosdoff | Mar. 2, 1948 |
| 2,462,275 | Morton | Feb. 22, 1949 |
| 2,500,294 | Phelps | Mar. 14, 1950 |

OTHER REFERENCES

"A Four-Tube Counter Decade," J. T. Potter, Electronics, June 1944; pages 110–113.

"Pre-determined Counter for Process Control," R. J. Blume, Electronics, 1948; pages 88–93.